United States Patent [19]

Takagi

[11] Patent Number: 5,050,849
[45] Date of Patent: Sep. 24, 1991

[54] VIBRATION BUFFER

[75] Inventor: Shigeyuki Takagi, Gifu, Japan

[73] Assignee: Teijin Seiki Company Limited, Osaka, Japan

[21] Appl. No.: 536,989

[22] Filed: Jun. 12, 1990

[30] Foreign Application Priority Data

Jun. 20, 1989 [JP] Japan .................................. 1-164125

[51] Int. Cl.$^5$ ............................................. F16M 1/00
[52] U.S. Cl. .................................... 267/136; 188/378; 188/283; 188/312
[58] Field of Search ............... 188/378, 379, 266, 275, 188/279, 280, 283, 311, 312, 313; 267/136, 69-74; 244/17.11, 17.27

[56] References Cited

U.S. PATENT DOCUMENTS

| 3,638,885 | 2/1972 | Reed | 188/283 X |
| 3,702,647 | 11/1972 | Richardson | 188/283 |
| 4,898,264 | 2/1990 | Miller | 188/280 X |

Primary Examiner—Douglas C. Butler
Attorney, Agent, or Firm—Michael L. Keller

[57] ABSTRACT

A hydraulic vibration buffer for connection between two members with a case coupled with the first member, a piston rod with its top end coupled with a second member, a piston coupled with a base end of the piston rod and housed within the cylinder case so as to divide the cylinder case into first and second chambers, fluid source, a tank, and a control valve disposed in fluid paths connecting the cylinder case, the fluid source, and the tank with one another. The vibration buffer also includes returning-force application device constituted by a swingable link with its one and other ends coupled with the first member and the housing block through which the fluid paths extend, and a pair of springs disposed between a center portion of the swingable link and the spool of the control valve.

7 Claims, 1 Drawing Sheet

VIBRATION BUFFER

BACKGROUND OF THE INVENTION

1. Field of the invention

The present invention relates to a hydraulic vibration buffer.

2. Description of the Prior Art

A helicopter is one example of a moving body which is subject to substantial vibrations. The rotating portions such as the engine etc. cause the body as a whole to vibrate, but it is preferred that vibration of seats, measuring instruments, etc. be minimized.

To this end, various vibration dampers and shock absorbers have been proposed. For example, such a device is shown in FIG. 2. In this device a case 52 is attached to seat 51 or the like, and a displaceable main weight 55 is housed in the case 52 and elastically supported by springs 53 and 54 extending from opposite sides as shown. An adjustment weight 56 is swingably coupled with the main weight 55. An actuator 57 attached to the case 52, is coupled by a link mechanism 58 to adjustment weight 56. A speed sensor 59 is provided for detecting the speed of displacement of the main weight 55, and an acceleration sensor 60 for detecting the acceleration of vibration of the case 52. Control means 61 controls actuator 57 on the basis of the respective outputs of the speed and acceleration sensors 59 and 60.

In this device, the actuator 57 is actuated responsive to the speed and acceleration sensors 59 and 60 so as to automatically adjust the position of swing of adjustment weight 56, that is, the position of center of gravity of the adjustment weight 56, and consequently the frequency of vibration of the seat 51 is made to accord with the natural frequency of the whole of the main weight 55 and the adjustment weight 56, so that the vibration energy of the seat 51 is absorbed by the main weight 55 and the adjustment weight 56.

In such a device, however, there has been a problem that, since vibration is absorbed by the main and adjustment weights 55 and 56, each having a large inertia mass, the response rate to the change of the frequency of the vibration source (that is, the seat 51) is so low that the effect of vibration absorption is extremely low at transient times. Moreover, there has been another problem in that the device as a whole is large in size and heavy in weight and the device is low in reliability because of use of an electric circuit and various sensors.

SUMMARY OF THE INVENTION

It is therefore an object of the present invention to solve the foregoing problems in the prior art.

It is another object of the present invention to provide a vibration buffer between first and second members which is quickly responsive to changes of the vibration frequency, small in size, light in weight, and high in reliability.

In order to attain the foregoing objects, according to the present invention, the vibration buffer includes a cylinder case coupled with the first member; a piston rod with its top end coupled with the second member; a piston coupled with a base end of the piston rod and housed within the cylinder case so as to divide the cylinder case into first and second chambers; a fluid source; a tank; a control valve disposed in the way of a path connecting the cylinder case, the fluid source and the tank with one another, for discharging fluid in the first chamber into the tank and supplying pressurized fluid from the fluid source to the second chamber when internal pressure of the first chamber increased by relative displacement between the piston and the cylinder case gives an effect to a spool so that the spool moves in the direction toward one end thereof, and for discharging fluid in the second chamber into the tank and supplying pressurized fluid from the fluid source to the first chamber when internal pressure of the second chamber increased by relative displacement between the piston and the cylinder case gives an effect to the spool so that the spool moves in the direction toward the other end thereof; and returning-force application means constituted by a swingable link with its one and other ends coupled with the first and second members respectively so as to be swingable in the direction reverse to the direction of movement of the spool, and spring means disposed between a center portion of the swingable link and the spool of the control valve, for giving the spool returning force in the direction reverse to the direction of movement of the spool when the piston and the cylinder case displace relative to each other, whereby vibration produced in one of the first and second members is lessened relative to the other of the first and second members.

Now it is assumed that a vibrating object, for example, the body of a helicopter corresponds to the second member, and the one which is desired to be made to stand still without vibrating, for example, a seat, corresponds to the first member. In this state, when the second member moves to approach the first member by vibration, the piston displaces within the cylinder case, so that, for example, the internal pressure of the first chamber is increased. This increased internal pressure of the first chamber is transmitted to the spool of the control valve so as to move the spool in the direction toward the one end thereof. As a result, the first chamber is connected with the tank, so that fluid transmitted from the first chamber by the piston is discharged into the tank. On the other hand, although fluid in the second chamber becomes deficient by the above-mentioned displacement of the piston, since the spool moving in the direction toward the one end thereof makes the second chamber in connection with the fluid source, pressurized fluid is rapidly supplied into the second chamber. The swingable link swings about the one end thereof in the direction reverse to the direction of the movement of the spool, that is, in the direction toward the other end thereof in this case, so that the swing of the swingable link is transmitted to the spool of the control valve through the spring means to thereby give the spool returning force in the direction opposite to the direction of movement of the spool. Then, since the quantity of swing of the swingable link is proportional to the quantity of movement of the second member, the above-mentioned returning force is proportional to the quantity of movement of the second member, that is the quantity of displacement of the piston. Thus, when the spool moves in the direction toward the one end thereof, a returning force to restore the spool to its neutral position is exerted onto the spool so as to suppress the movement of the spool, so that the effect of suppressing vibration is improved and the cylinder case can be miniaturized.

Next, when the second member is moved away from the first member by vibration, internal pressure of the second chamber is increased, so that the spool moves in the direction toward the other end thereof. As a result, the fluid in the second chamber is discharged into the tank, and the pressurized fluid is supplied to the first chamber from the fluid source. The swingable link swings in the direction toward the one end in this case, so that this swing of the swingable link is transmitted to the spool through the spring means as returning force in the direction opposite to the direction of movement of the spool. Thus, even if the second member is moved by vibration, since fluid escapes smoothly from the inside of the cylinder case and fluid is supplied at the same time, the piston displaces in the inside of the cylinder case smoothly, so that the movement of the second member is hardly transmitted to the first member.

Moreover, when the second member is desired to be stationary, the spool of the control valve is returned to its neutral position by the above-mentioned returning force, so as to prevent fluid in the first and second chambers from flowing. Thus, according to the present invention, because of using no member having a large inertia mass but a fluid instrument having superior flowability, the response time to the change of vibration frequency is fast, the vibration can be absorbed surely even at transient times. Further, it is possible to reduce the device in weight and size as a whole, and it is possible to improve the reliability of the device.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENT

An embodiment of the present invention will be described with reference to FIG. 1 of the drawings.

Figure 2:
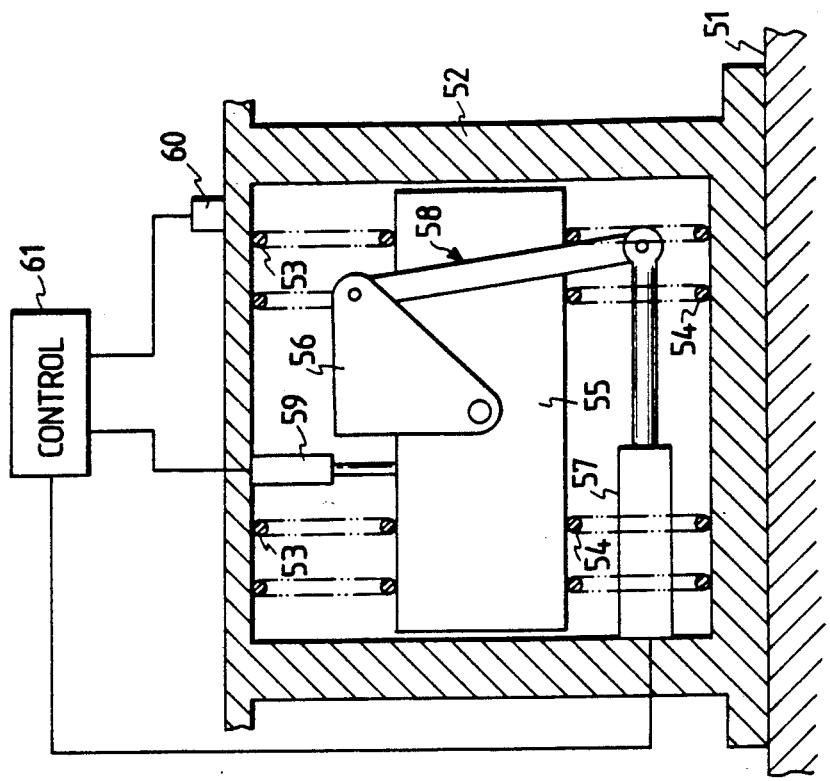
FIG. 2 is a schematic section view illustrating an example of a conventional vibration damper according to the prior art.
Figure 1:
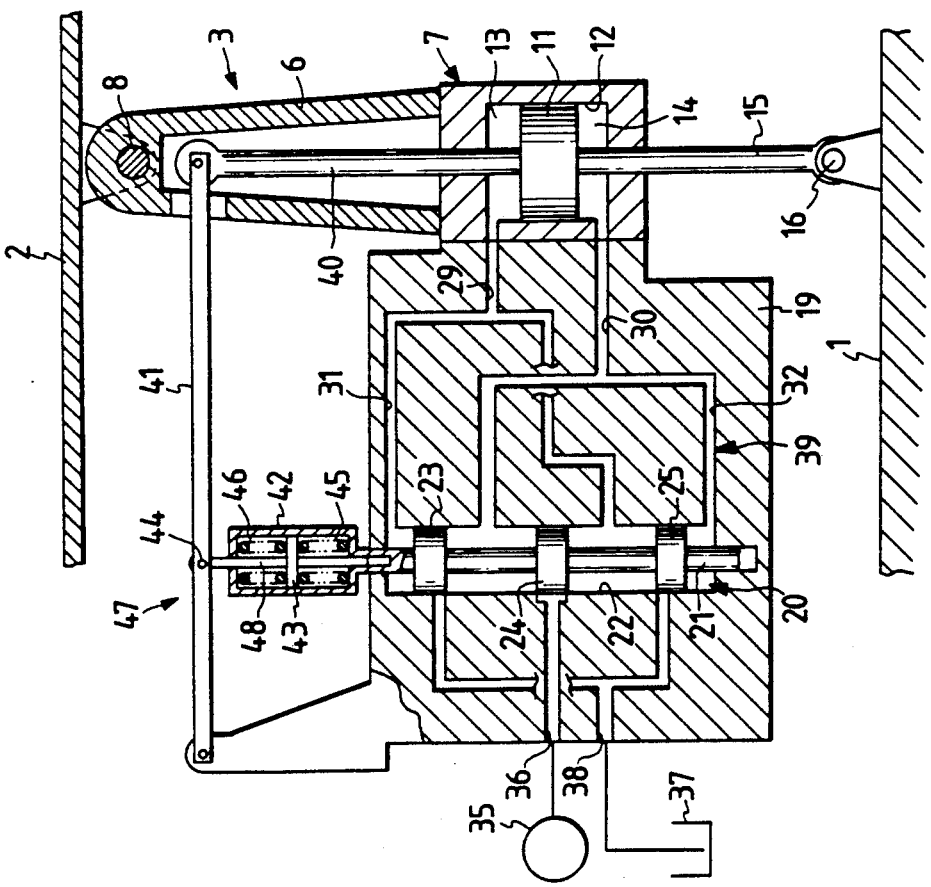
FIG. 1 is a schematic sectional view illustrating an embodiment of the present invention.

In FIG. 1, a second member 1 such as a body of a helicopter or the like is made to vibrate as a whole by the rotation of an engine, a rotor, or the like. A first member 2, such as a seat, measuring instruments or the like, supported by the second member 1 is desired to be stationary and vibration free in spite of the vibration of the second member 1. A vibration buffer 3 provided between the second and first members 1 and 2 includes a cylinder case 7 to which a bracket 6 is attached. The bracket 6 is coupled with the second member 2 through a pin 8 so as to couple the cylinder case 7 with the second member 1.

A piston 11 is moveably mounted in a chamber 12 of the cylinder case 7 so as to divide chamber 12 into first and second chambers 13 and 14 positioned on the sides of the first and second members 2 and 1 respectively. A piston rod 15 is coupled at its base end with the piston 11 so as to penetrate the cylinder case 7 and extend toward the second member 1 so that the top end of the piston end 15 is coupled with the second member 1 through a pin 16. A housing block 19 is attached to the cylinder case 7 and a spool chamber 22 for housing a spool 21 of a control valve 20 is formed within the housing block 19. On the spool 21, three lands 23 and 25 are formed from the other end side toward the one end side.

A first path 29 connects the spool chamber 22 between the lands 24 and 25 with the first chamber 13 and a second path 30 connects the spool chamber 22 between the lands 23 and 24 with the second chamber 14. A first pilot path 31 is formed to connect first path 29 with the other end of the spool chamber 22, and the first pilot path 31 leads fluid in the first chamber 13 to the side of the other end of the land 23 so as to move the spool 21 in the direction toward the one end thereof.

A second pilot path 32 is formed to connect second path 30 with the one end of the spool chamber 22, and the second pilot path 32 leads fluid in the second chamber 14 to the side of one end of the land 25 so as to move the spool 21 in the direction toward the other end thereof. A fluid source 35 for discharging pressurized fluid is connected with the spool chamber 22 through a supply path 36 which is closed by the land 24 when the spool 21 is in its neutral position. A tank 37 is connected with the spool chamber 22 through a discharge path 38 branched into two paths, the discharge path 38 being closed by the lands 23 and 25 when the spool 21 is in its neutral position. The first and second paths 29 and 30, the first and second pilot paths 31 and 32, the supply path 36 and the discharge path 38 constitute, as a whole, a path 39 connecting the cylinder case 7, the fluid source 35 and the tank 37 with one another.

Thus, control valve 20 is disposed in path 39. When the spool 21 moves in the direction toward the one end thereof, the path 39 discharges fluid in the first chamber 13 to the tank 37 and supplies pressurized fluid from the fluid source 35 to the second chamber 14 at the same time. On the contrary, when the spool 21 moves in the direction toward the other end thereof, the path 39 discharges fluid in the second chamber 14 to the tank 37 and supplies pressurized fluid from the fluid source 35 to the first chamber 13 at the same time.

A swingable link 41 has its one end swingably coupled with the first member 2 through the housing block 19 and its other end swingably coupled with the second member 1 through a rod 40 fixed to the piston 11, the piston 11 and the piston rod 15. This swingable link 41 is made to swing in the direction opposite to the direction of movement of the spool 21 by the movement of the piston 11, that is, in the direction toward the other end thereof in the case where the spool 21 moves in the direction toward the one end thereof, and on the contrary, in the direction toward the one end in the case where the spool 21 moves in the direction toward the other end thereof.

A case 42 is provided on the other end of the spool 21, and a link rod 48 having a flange 43 is inserted in this case 42. The other end of this link rod 48 is connected with a center portion of the swingable link 41 through a pin 44. Springs 45 and 46 are interposed respectively between a wall of one end of the case 42 and the flange 43 and between a wall of the other end of the case 42 and the flange 43. That is, the springs 45 and 46 are interposed between the center portion of the swingable link 41 and the spool 21 of the control valve 20. The swingable link 41, and case 42, the link rod 48 and the springs 45 and 46 constitute, as a whole, a returning force application means 47 for providing the spool 21 returning force in the direction opposite to the direction of movement of the spool 21. Since the distance from the one end of the swingable link 41 to the pin 44 is much shorter than the distance from the pin 44 to the other end of the swingable link 41, the quantity of return movement given to the spool 21 by the swingable link 41 is much smaller than the quantity of displacement of the piston 11, resulting in improvement in stability of the circuit.

Next, the operation of the embodiment of the present invention will be described.

Now, when the second member 1 moves to approach the first member 2, the piston 11 displaces within the cylinder chamber 12, so that internal pressure of the first chamber 13 is increased. This increased internal pressure of the first chamber 13 is transmitted to the spool 21 through the first pilot path 31 so as to move the spool 21 in the direction toward one end thereof. As a result, the discharge path 38 is released from being closed by the land 25 so that the first chamber 13 is connected with the tank 37, and fluid transmitted from the first chamber 13 by the displacement of the piston 11 is discharge into the tank 37. On the other hand, although fluid in the second chamber 14 is deficient by the above-mentioned displacement of the piston 11, the spool 21 moves in the direction toward the one end thereof as described above, and the supply path 36 is released from being closed by the land 24 so that the second chamber 14 is connected with the fluid source 35 and pressurized fluid is supplied from the fluid source 35 into the second chamber 14. Then, since fluid from the fluid source 35 is pressurized the fluid flows into the second chamber 14 rapidly so that the piston 11 is not prevented from displacing. The above-mentioned displacement of the piston 11 makes the swingable link 41 swing about the one end thereof in the direction opposite to the direction of the movement of the spool 21, that is, in the direction toward the other end thereof away from the spool 21, and this swing of the swingable link 41 is transmitted to the spool 21 through the link rod 48, the springs 45 and 46 and the case 42 so as to give the spool 21 returning force in the direction opposite to the direction of movement (toward the one end) of the spool 21. Then, since the quantity of swing of the swingable link 41 is proportional to the quantity of displacement of the piston 11, the returning force exerted on the spool 21 is proportional to the quantity of displacement of the piston 11. As has been descried, when the spool 21 moves in the direction toward its one end, the returning force to restore the spool 21 to its neutral position always gives an effect to the spool 21 so as to restrain the movement of the spool 21, so that the effect of suppressing vibration is improved and the cylinder case 7 can be minimized.

Next, when the second member 1 is moved away from the first member 2 by vibration, internal pressure of the second chamber 14 is increased, so that the spool 21 moves in the direction toward its other end thereof. As a result, fluid in the second chamber 14 is discharged into the tank 37, and pressurized fluid is supplied into the first chamber 13 from the fluid source 35. Then the swingable link 41 swings in the direction opposite to the direction of movement of the spool 21, that is, in the direction toward its one end, and this swing of the swingable link 41 is transmitted to the spool 21 through the springs 45 and 46, as returning force in the direction toward the one end thereof. As has been described, when the second member 1 is moved by vibration, since fluid in the first or second chamber 13 or 14 is discharged into the tank 37 smoothly and fluid is rapidly supplied from the fluid source 35 to the second or first chamber 14 or 13, the piston 11 displaces in the cylinder case 7 smoothly, so that the vibration of the second member 1 is lessened by this vibration buffer 3 and is hardly transmitted to the first member 2.

Moreover, when the second member 1 stops vibrating, spool 21 of the control valve 20 is returned to its neutral position by the above-mentioned returning force from the returning force application means 47 so as to prevent fluid in the first and second chambers 13 and 14 from flowing. As has been described, in this embodiment, because of not using a member such as a weight having a large inertia mass but rather using a hydraulic device which is superior in flowability, responsiveness to the change of the vibration frequency is high, and vibration can be absorbed surely even at a transient time. Further, it is possible to reduce the apparatus in size as well as weight as a whole, and it is possible to improve the reliability.

Although it is assumed in the above-mentioned embodiment that the second member 1 corresponds to a vibration source and the first member 2 corresponds to a member desired to stand still, the present invention may be applied to the case where the first member 2 corresponds a vibration source and the second member 1 corresponds a member desired remain stationary.

As has been described, according to the present invention, improved responsiveness to changes of vibration frequency is achieved, and it is possible to reduce the apparatus in size as well as weight as a whole, and it is further possible to improve the reliability.

What is claimed:

1. A hydraulic vibration buffer for buffing vibration between first and second members comprising:
    a housing having an internal space;
    a piston dividing said internal space into first and second chambers and having respective rods adapted for connection to said first and second members;
    means for supplying hydraulic fluid;
    a return tank for said fluid;
    means for establishing a plurality of fluid path connections between said first and second chambers and said supplying means and said return tank;
    control valve means having a valve member disposed in said fluid path connection and movable responsive to movement of said piston for establishing a specific path connection causing pressure in said first chamber to decrease and pressure in said second chamber to increase when said piston moves in the direction of said first chamber in response to movement between said first and second members in one direction and movable responsive to movement of said piston for establishing a second path connection causing pressure in said second chamber to decrease and pressure in said first chamber to increase in response to movement between said first and second members in the opposite direction; and
    mechanical means connected between one of said rods and said control valve means for urging said valve member to reverse the direction of movement thereof in response to movement of said piston so as to lessen the vibration communicated between said first and second members, wherein said mechanical means includes a casting, a link rod mounted for movement in said casing and having a center portion and first and second springs engaging said center portion.

2. A buffer as in claim 1 wherein said valve member includes first, second and third lands and said fluid path establishing means includes means forming a valve chamber in which said valve member moves, means forming a path between said supplying means and said valve chamber normally blocked by said second land, means forming with said first and second lands a path between said valve chamber and said first chamber and a path between said tank and said first chamber when said piston member moves in the direction of said second chamber, and means forming with said second and third lands a path between said valve chamber and second chamber and a path between said tank and said second chamber when said piston members moves in the direction of said first chamber.

3. A buffer as in claim 1 wherein said mechanical means includes a casing, a link rod mounted for movement in said casing and having a center portion and first and second springs engaging said center portion.

4. A buffer as in claim 1 wherein said mechanical means includes a swingable link connecting said piston rod to said link rod so that the movement of said valve member caused by movement of said piston is less than the movement of said piston.

5. A buffer as in claim 1 further including means for pivotally attaching said housing to said first member and means for pivotally attaching said housing to said second member.

6. A vibration buffer comprising:
a cylinder case coupled with a first member;
a piston rod with its top end coupled with a second member;
a piston coupled with a base end of said piston rod and housed within said cylinder case so as to divide said cylinder case into first and second chambers;
a fluid source;
a tank;
a control valve disposed in the way of a path connecting said cylinder case, said fluid source and said tank with one another, for discharging fluid in said first chamber into said tank when internal pressure of said first chamber increased by relative displacement between said piston and said cylinder case gives an effect to a spool so that said spool moves in the direction toward the one end thereof, and for supplying pressed fluid from said fluid source to said first chamber when internal pressure of said second chamber increased by relative displacement between said piston and said cylinder case gives an effect to said spool so that said spool moves in the direction toward the other end thereof; and returning-force application means constituted by a swingable link with its one and other ends coupled with said first and second members respectively so as to be swingable in the direction reverse to the direction of movement of said spool, and spring means disposed between a center portion of said swingable link and said spool of said control valve, for giving said spool returning force in the direction reverse to the direction of movement of said spool when said piston and said cylinder case displace relative to each other, whereby vibration produced in one of the said first and second members is lessened relative to the other of said first and second members.

7. A hydraulic vibration buffer for buffing vibration between first and second members comprising:
a housing having an internal space and connected with said first member;
a piston dividing said internal space into first and second chambers and having a rod adapted for connection to said second member;
means for supplying hydraulic fluid;
a return tank for said fluid;
means for establishing a plurality of fluid path connections between said first and second chambers and said supplying means and said return tank;
control valve means having a valve member disposed in said fluid path connection and movable responsive to movement of said piston for establishing a specific path connection causing pressure in said first chamber to decrease when said piston moves in the direction of said first chamber in response to movement between said first and second members in one direction and movable responsive to movement of said piston for establishing a second path connection causing pressure in said first chamber to increase in response to movement between said first and second members in the opposite direction; and
mechanical means connected between said rod and said control valve means for urging said valve member to reverse the direction of movement thereof in response to movement of said piston so as to lessen the vibration communicated between said first and second members, wherein said mechanical means includes a casing, a link rod mounted for movement in said casing and having a center portion and first and second springs engaging said center portion.

* * * * *